(12) United States Patent
Dong et al.

(10) Patent No.: US 11,954,522 B2
(45) Date of Patent: Apr. 9, 2024

(54) METHOD FOR PROCESSING TASKS IN PARALLEL, DEVICE AND STORAGE MEDIUM

(71) Applicant: BEIJING BAIDU NETCOM SCIENCE AND TECHNOLOGY CO., LTD., Beijing (CN)

(72) Inventors: Daxiang Dong, Beijing (CN); Haifeng Wang, Beijing (CN); Dianhai Yu, Beijing (CN); Yanjun Ma, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 772 days.

(21) Appl. No.: 17/076,346

(22) Filed: Oct. 21, 2020

(65) Prior Publication Data
US 2021/0255896 A1 Aug. 19, 2021

(30) Foreign Application Priority Data
Feb. 14, 2020 (CN) .......................... 202010093670.8

(51) Int. Cl.
G06F 9/46 (2006.01)
G06F 9/48 (2006.01)
(Continued)

(52) U.S. Cl.
CPC .............. G06F 9/4881 (2013.01); G06F 9/52 (2013.01); G06N 20/00 (2019.01)

(58) Field of Classification Search
CPC ................................................... G06F 9/4881
(Continued)

(56) References Cited

U.S. PATENT DOCUMENTS 7,916,858 B1 * 3/2011 Heller ................. H04M 3/5175
379/265.12
8,266,289 B2 * 9/2012 Saha ..................... G06F 9/5027
704/E15.048
(Continued)

FOREIGN PATENT DOCUMENTS

CN 101777064 A 7/2010
CN 107885762 A 4/2018
(Continued)

OTHER PUBLICATIONS

Extended European Search Report for Application No. 20202929.4, dated Apr. 13, 2021, 7 pages.
(Continued)

Primary Examiner — Mehran Kamran
(74) Attorney, Agent, or Firm — Lippes Mathias LLP

(57) ABSTRACT

Embodiments of the present disclosure disclose a method for processing tasks in parallel, a device and a storage medium, and relate to a field of artificial intelligent technologies. The method includes: determining at least one parallel computing graph of a target task; determining a parallel computing graph and an operator scheduling scheme based on a hardware execution cost of each operator task of each of the at least one parallel computing graph in a cluster, in which the cluster includes a plurality of nodes for executing the plurality of operator tasks, and each parallel computing graph corresponds to at least one operator scheduling scheme; and scheduling and executing the plurality of operator tasks of the determined parallel computing graph in the cluster based on the determined parallel computing graph and the determined operator scheduling scheme.

18 Claims, 5 Drawing Sheets

(51) Int. Cl.
*G06F 9/52* (2006.01)
*G06N 20/00* (2019.01)

(58) Field of Classification Search
USPC .......................................................... 718/106
See application file for complete search history.

(56) References Cited

U.S. PATENT DOCUMENTS

| | | | |
|---|---|---|---|
| 10,120,727 B2* | 11/2018 | Bartfai-Walcott | G06F 9/5094 |
| 11,593,540 B1* | 2/2023 | Popovici | G06F 9/455 |
| 2009/0044242 A1* | 2/2009 | Ramakrishnan | H04N 21/4384 |
| | | | 725/118 |
| 2011/0093852 A1* | 4/2011 | Li | G06F 11/3404 |
| | | | 718/100 |
| 2014/0101669 A1* | 4/2014 | Lee | G06F 9/54 |
| | | | 718/105 |
| 2018/0089002 A1* | 3/2018 | Xia | G06F 1/324 |
| 2019/0138314 A1* | 5/2019 | Geigel | G06F 9/3836 |
| 2019/0205737 A1* | 7/2019 | Bleiweiss | G06N 3/063 |
| 2019/0266015 A1* | 8/2019 | Chandra | G06F 9/505 |
| 2020/0050971 A1* | 2/2020 | Kim | G06F 11/3404 |
| 2020/0082273 A1* | 3/2020 | Rossi | G06F 9/5038 |
| 2020/0097333 A1* | 3/2020 | Jain | G06F 9/52 |
| 2020/0184366 A1* | 6/2020 | Mandal | G06N 3/042 |
| 2020/0210239 A1* | 7/2020 | Geigel | G06F 9/5061 |
| 2020/0249998 A1* | 8/2020 | Che | G06N 20/00 |
| 2020/0301898 A1* | 9/2020 | Samynathan | G06F 16/2453 |
| 2020/0342286 A1* | 10/2020 | Zhang | G06N 3/04 |
| 2020/0342322 A1* | 10/2020 | Han | G06N 3/045 |
| 2021/0224110 A1* | 7/2021 | Yu | G06F 30/20 |
| 2021/0255896 A1* | 8/2021 | Dong | G06F 9/4881 |
| 2022/0043675 A1* | 2/2022 | Xia | G06F 9/4881 |

FOREIGN PATENT DOCUMENTS

| | | |
|---|---|---|
| CN | 108292374 A | 7/2018 |
| CN | 109669772 A | 4/2019 |
| CN | 110018817 A | 7/2019 |
| CN | 110365799 A | 10/2019 |
| CN | 110399222 A | 11/2019 |
| CN | 110489223 A | 11/2019 |
| CN | 110503195 A | 11/2019 |
| JP | 2018538607 A | 12/2018 |
| KR | 20170120022 A | 10/2017 |

OTHER PUBLICATIONS

Office Action for Japanese Application No. 2020-217476, dated Feb. 8, 2022, 3 pages.
Office Action for CN202010093670.8 dated Jan. 5, 2023, 4 pages.
Research on Task Allocation Problem in Parallel Computing System, Masteral Dissertation Dalian University of Technology, May 12, 2010, 49 pages, English Abstract.
Research and Improvement of Job Scheduling Algorithm Based on Hadoop, Shanghai Normal University Master of Philosophy, May 22, 2019, 54 pages, English Abstract.
An Efficient Parallel Scheduling Algorithm of Dependent Task Graphs, China Academic Journal Electronic Publishing House, Oct. 20, 2003, Authors : S. Mingsheng, S. Shixin and W. Qingxian Proc. of 4th Int. Conf. on Parallel and Distributed Computing Applications and Technologies PDCAT, pp. 595-598, 2003.
Office Action for Korean Application No. 10-2020-0178497, dated Aug. 3, 2022, 6 pages.
Notice of Allowance for Chinese Application No. 202010093670.8, dated May 2, 2023, 12 pages.

* cited by examiner

METHOD FOR PROCESSING TASKS IN PARALLEL, DEVICE AND STORAGE MEDIUM

CROSS REFERENCE TO RELATED APPLICATIONS

This application is based on and claims priority to Chinese patent application Serial No. 202010093670.8 filed on Feb. 14, 2020, the entire contents of which are incorporated herein by reference.

FIELD

Embodiments of the present disclosure relates to a field of computer technologies, and more particularly to a field of artificial intelligent technologies and parallel processing technologies.

BACKGROUND

With the development of artificial intelligent technologies, deep learning technology is used more and more widely. The deep learning technology typically includes a training procedure of a deep learning model and an applying procedure of the deep learning model after the training.

Presently, with the increase of a computation amount in the training procedure and the applying procedure of the deep learning model, in order to shorten the time, a parallel processing method has been gradually adopted. That is, training or applying tasks of the deep learning model are assigned to a cluster composed of a plurality of nodes for parallel processing. For example, parallel training is performed by employing a GPU (graphic processing unit) multi-machine and multi-card.

In the related art, how to improve the efficiency of the parallel processing in a computation procedure of the deep learning model is one of current research hotspots.

SUMMARY

Embodiments of the present disclosure provide a method for processing tasks in parallel, a device and a storage medium.

In a first aspect, embodiments of the present disclosure provide a method for processing tasks in parallel. The method includes: determining at least one parallel computing graph of a target task, each of the at least one parallel computing graph including a plurality of operator tasks; determining a parallel computing graph and an operator scheduling scheme based on a hardware execution cost of each operator task of each of the at least one parallel computing graph in a cluster, in which the cluster including a plurality of nodes for executing the plurality of operator tasks, and each parallel computing graph corresponds to at least one operator scheduling scheme; and scheduling and executing the plurality of operator tasks of the determined parallel computing graph in the cluster based on the determined parallel computing graph and the determined operator scheduling scheme.

In a second aspect, embodiments of the present disclosure also provide an apparatus for processing tasks in parallel. The apparatus includes: a computing graph determining module, a scheduling scheme screening module and a task scheduling executing module.

The computing graph determining module is configured to determine at least one parallel computing graph of a target task, each of the at least one parallel computing graph including a plurality of operator tasks. The scheduling scheme screening module is configured to determine a parallel computing graph and an operator scheduling scheme based on a hardware execution cost of each operator task of each of the at least one parallel computing graph in a cluster. The cluster includes a plurality of nodes for executing the plurality of operator tasks, and each parallel computing graph corresponds to at least one operator scheduling scheme. The task scheduling executing module is configured to schedule and to execute the plurality of operator tasks of the determined parallel computing graph in the cluster based on the determined parallel computing graph and the determined operator scheduling scheme.

In a third aspect, embodiments of the present disclosure further provide an electronic device. The electronic device includes at least one processor and a memory. The memory is communicatively coupled to the at least one processor. The memory is configured to store instructions executed by the at least one processor, and when the instructions are executed by the at least one processor, the at least one processor is caused to execute the method for processing the tasks in parallel according to any one of embodiments of the present disclosure.

In a fourth aspect, embodiments of the present disclosure provide a non-transitory computer readable storage medium having computer instructions stored thereon. The computer instructions are configured to cause a computer to execute the method for processing the tasks in parallel according to any one of embodiments of the present disclosure.

Other effects achieved by the above alternative implementation will be described below with reference to detailed embodiments.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding, and should be merely regarded as an example. Therefore, it should be recognized by the skilled in the art that various changes and modifications may be made to the embodiments described herein without departing from the scope and the spirit of the present disclosure. Meanwhile, for clarity and conciseness, descriptions for well-known functions and structures are omitted in the following description.

Embodiment 1

Figure 1:
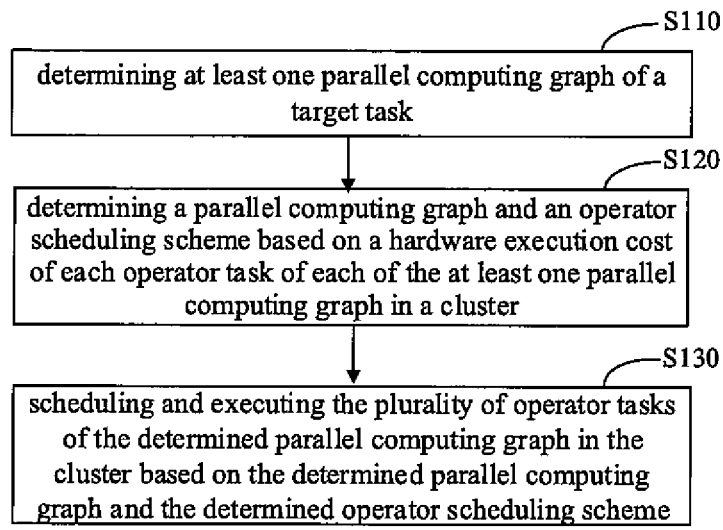
FIG. 1 is a flow chart illustrating a method for processing tasks in parallel according to Embodiment 1 of the present disclosure.

FIG. 1 is a flow chart illustrating a method for processing tasks in parallel according to Embodiment 1 of the present disclosure. This embodiment is applicable to a process of scheduling and executing a target task in parallel in a cluster. The target task may be any task that requires a large amount of computation, such as, a training procedure or a running procedure of a machine learning model, which generally requires a large amount of data computation and may be used as the target task. The cluster according to embodiments of the present disclosure includes a plurality of nodes. The node may be an electronic device that may perform a preset computing function, such as a CPU (central processing unit) and a GPU (graphic processing unit). The nodes in the cluster may be devices with different hardware performance indexes, and further may have different software operating environments. Communication between nodes is implemented by a certain topology relationship. The cluster is generally a hardware platform provided for the target task to run. Different clusters may have different nodes and software conditions.

The method for processing the tasks in parallel provided by this embodiment includes the following.

At block S110, at least one parallel computing graph of a target task is determined, and each of the at least one parallel computing graph includes a plurality of operator tasks.

At this block, the parallel computing graph is a graph structure that includes a plurality of operator tasks meeting a requirement for a topology relationship for execution of the target task. Each operator task may be independently scheduled to be executed by the node in the cluster. There are a plurality of types of operator tasks, typically including a computation type and a communication type. A computation operator task is configured to calculate data. A communication operator task is configured to transmit data between the nodes. Of course, it may be understood that there may be other types of operator tasks for different target tasks.

For an example, assuming that the target task is a training task or a running task of a machine learning model, and the computation operator task includes at least one of: a mathematical operator, an array operator and a neural-network building block operator. The mathematical operator may include operators such as subtraction, addition, division, and gradient calculation. The array operator may include operators such as concatenation, splicing, splitting, and sequencing. The neural-network building block operator includes operators, such as classifier (such as, softmax), normalization (such as, sigmoid), activation function (such as, ReLU), and convolution. The communication operator task may be further classified into different types based on a communication way and a communication post-processing algorithm.

An edge relationship between the operator tasks reflects a data flow direction between the operator tasks. For example, pointing from an A operator task to a B operator task indicates that a data calculation result of the A operator task may be outputted to the B operator task as input data of the B operator task.

For the target task, the at least one parallel computing graph may be generated based on a single computer computing graph of the target task and the number of nodes in the cluster.

Generally, for the single computer computing graph, there may be a plurality of parallel computing graphs conforming to a multi-node topology rule.

At block S120, a parallel computing graph and an operator scheduling scheme are determined based on a hardware execution cost of each operator task of each of the at least one parallel computing graph in a cluster, in which the cluster includes a plurality of nodes for executing the plurality of operator tasks, and each parallel computing graph corresponds to at least one operator scheduling scheme.

The operator scheduling scheme is a detailed scheme for a certain parallel computing graph that assigns the operator tasks to respective nodes based on a set sequence for parallel execution, which mainly reflects a scheduling sequence. In the above operations, when the parallel computing graph and the operator scheduling scheme are determined for the target task, the hardware execution cost of each operator task in the cluster is considered as a screening basis.

The hardware execution cost reflects a cost of a specific operator task being executed by a node in a specific hardware state, which may be obtained in various ways, such as by actual measurement collection or estimation prediction. In subsequent embodiments of the present disclosure, description will be made in detail below to explain how to screen the parallel computing graphs and the operator scheduling schemes based on the hardware execution cost of each operator task.

At block S130, the plurality of operator tasks of the determined parallel computing graph are scheduled and executed in the cluster based on the determined parallel computing graph and the determined operator scheduling scheme.

The parallel computing graph and the operator scheduling scheme determined by screening the parallel computing graphs and the operator scheduling schemes based on the hardware execution cost can be considered as a preferred solution with a higher parallel efficiency. The computing procedure of the target task in the cluster may be formally executed based on the preferred parallel computing graph and the preferred operator scheduling scheme.

With the technical solution of embodiments of the present disclosure, when the parallel computing graph and the operator scheduling scheme are determined for the target task, the hardware execution cost of each operator task in the cluster is considered as the screening basis, such that the execution of the target task may be better adapted to the clusters under different environmental conditions, to achieve an optimal parallel efficiency.

In a conventional solution that only considers advantages and disadvantages of the scheduling sequence of the parallel computing graph and a load capacity of the cluster, if the state of the node of the cluster is not concerned, such as a performance of a computing chip of the node and a communication state between the nodes, an overall running period of the target task may be affected. For example, if input data of a certain operator task needs to use output data of a previous in-degree operator task, and the previous in-degree operator task is scheduled to a node with a poor computing performance, it may take a long time for the node to calculate, and subsequent operator tasks must wait, which integrally prolongs a computing period of the target task.

After the technical solution of embodiments of the present disclosure is employed, a hardware state of the node in the cluster may be further considered, which may improve the concurrency and optimize the utilization of hardware resources.

Embodiment 2

Figure 2A:
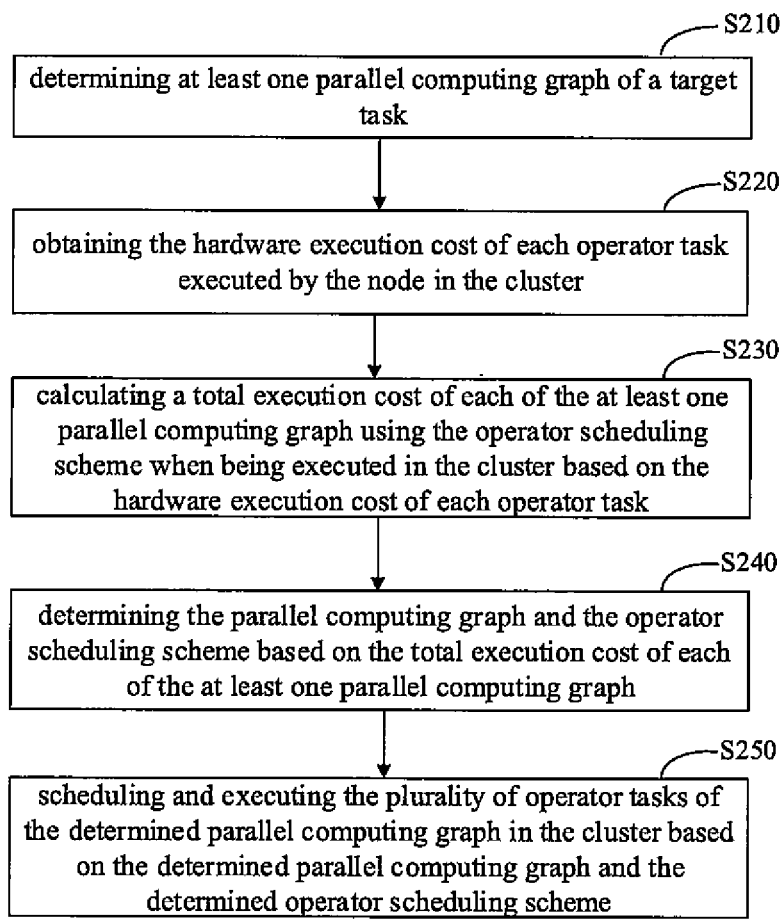
FIG. 2A is a flow chart illustrating a method for processing tasks in parallel according to Embodiment 2 of the present disclosure.

FIG. 2A is a flow chart illustrating a method for processing tasks in parallel according to Embodiment 2 of the present disclosure. On the basis of the above embodiment, in this embodiment, a total execution cost is calculated by obtaining the hardware execution costs of respective operator tasks, thereby implementing scheme screening. The method in this embodiment includes the followings.

At block S210, at least one parallel computing graph of a target task is determined.

At block S220, a hardware execution cost of each operator task executed by the node in the cluster is obtained.

The hardware execution cost of each operator task may be obtained in various ways, such as by actual measurement collection or querying from records.

Preferably, in a compiling stage of the parallel computing graph of the target task, the hardware execution cost of the operator task is collected by a small-scale heuristic computation. Obtaining the hardware execution cost of each operator task executed by the node in the cluster includes: scheduling the operator task to the cluster to execute a set scale of processing jobs; and collecting the hardware execution cost of the operator task executed by the node.

During the above scheduling, an operator scheduling scheme may be generated based on a default scheduling policy for the scheduling. An operator scheduling scheme may be used to explore and collect the hardware execution cost, or a plurality of operator scheduling schemes may be respectively selected to explore and collect the hardware execution costs for subsequent calculation and comparison. The operator task may be scheduled based on a complete operator scheduling scheme, or a part of the operator task may also be scheduled as long as the required hardware execution cost may be collected.

The above set scale is generally a small-scale computation. For example, each operator task completes a set amount of data computation or completes set times of data computation, as long as the set amount of data computation or the set times of data computation may be completed within a short period and may reflect a current hardware state of the cluster and may be used as the basis for estimating the total execution cost.

The hardware execution costs of all the operator tasks may be collected, or the hardware execution costs of some critical operator tasks may also be collected. The hardware execution costs of non-critical operator tasks generally have little impact on the total execution cost, or are generally less affected by the hardware performance.

When the operator tasks executed by different nodes or by using different operator scheduling schemes, hardware execution costs of some operator tasks may be quite different, while hardware execution costs of some operator tasks may be basically constant. Therefore, in a heuristic stage, the hardware execution costs of the operator task executed by using different operator scheduling schemes or by different nodes may be obtained by a small-scale computation as far as possible.

By heuristically computing the hardware execution cost, the hardware performance of the node of the cluster may be recorded. When enough data is recorded, a hardware execution cost of an operator task may be obtained by querying the history record subsequently.

At block S230, a total execution cost of each of the at least one parallel computing graph using the operator scheduling scheme when being executed in the cluster is calculated based on the hardware execution cost of each operator task.

The action at the block is to calculate the total execution cost based on the hardware execution costs of respective operator tasks. Alternatively, the action includes: counting the hardware execution costs of respective operator tasks based on a scheduling sequence in the operator scheduling scheme and a concurrency relation of respective operator tasks in the parallel computing graph to calculate the total execution cost.

Calculating the total execution cost is equivalent to accumulating the hardware execution costs of respective operator tasks. If an execution of an operator task needs to wait due to the concurrency relation, a waiting cost also needs to be added to the total execution cost.

There may be one or more hardware execution costs of each operator task, so the computed total execution cost may also be embodied in various ways.

For example, the hardware execution cost of the operator task may include at least one of: an execution period of the operator task and hardware occupation data of the operator task.

Figure 2B:
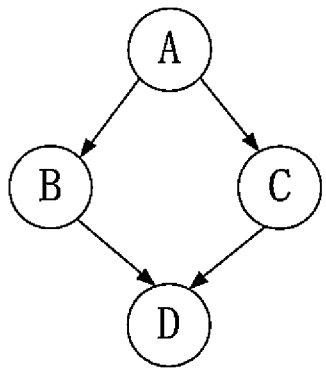
FIG. 2B is a schematic diagram illustrating a parallel computing graph according to Embodiment 2 of the present disclosure.

The execution period of the operator task may be a computable unit execution period, such as a period for performing data computation once, a period for performing a unit amount of data computation, or a period for transmitting a unit amount of data. The execution period for completing the overall target task may be calculated. Taking the parallel computing graph illustrated in FIG. 2B as an example, the parallel computing graph includes an A operator task, a B operator task, a C operator task, and a D operator task. The operator task A is taken as an in-degree operator of the B and C operator tasks, and each of the B and C operator tasks are taken as an in-degree operator of the D operator task. Assuming that execution periods of the A, B, C and D operator tasks are respectively 4, 3, 5 and 1, the execution of the D operator task requires for output data of the B and C operator tasks, such that after the B operator task is executed completely, it needs to wait until the C operator task is executed completely. Therefore, the total period is 4+5+1=10.

The hardware occupation data of the operator task includes at least one of: a video memory occupation ratio, a chip utilization ratio, and a network bandwidth utilization ratio. The hardware occupation data reflects a condition where the operator task occupies the hardware resource when being executed. Preferably, the hardware occupation data reflects the occupancy for unit data, such that the occupation for a larger amount of data processing may be calculated.

When there is one type of the hardware execution cost, such as a period, the total execution cost is also configured as a total period.

When there are a plurality of types of hardware execution costs, the total execution cost of the parallel computing graph may be a combination of a plurality of types of total execution costs, that is, a total execution cost is calculated for each type of hardware execution cost, such as a total execution period, a total chip occupancy rate, a total bandwidth occupancy rate, or an average occupancy rate. In this way, various indexes of the target task may be comprehensively reflected when the target task is executed in the cluster by using a certain operator scheduling scheme corresponding to a certain parallel computing graph.

The total execution cost of the parallel computing graph may also be a weighted sum value of the plurality of types of total execution costs. That is, the total execution costs of different types are normalized, and then weighted and summed based on preset weights, to facilitate comparison.

In the above alternative implementation of the present disclosure, there are the plurality of types of hardware execution costs, and the total execution cost of the scheduling scheme may be determined from multiple dimensions, such that the scheduling schemes may be screened based on different requirements.

At block S240, the parallel computing graph and the operator scheduling scheme are determined based on the total execution cost of each of the at least one parallel computing graph.

Screening the parallel computing graphs and the operator scheduling schemes may be performed for a specific parallel computing graph, so as screening a plurality of operator scheduling schemes corresponding the parallel computing graph, and may also be performed for both a plurality of parallel computing graphs and a plurality of operator scheduling schemes corresponding to the plurality of parallel computing graphs. When the parallel computing graph using a corresponding operator scheduling scheme has the total execution cost is lower than a set threshold value, the parallel computing graph using a corresponding operator scheduling scheme may be taken. All the total execution costs may be sorted in a descending order for the screening. The screening may also be performed based on a requirement, for example, a short execution period or a low chip occupancy rate is preferentially concerned.

All the above procedures belong to the compiling stage of the parallel computing graph, which may be completed in a short period and imperceptible to an initiator of the target task.

At block S250, the plurality of operator tasks of the determined parallel computing graph are scheduled and executed in the cluster based on the determined parallel computing graph and the determined operator scheduling scheme.

After the compiling stage of the parallel computing graph is completed, the parallel computing graph and the operator scheduling scheme are determined, and then the execution stage is performed to complete an overall execution procedure of the target task.

In the above alternative implementation of the present disclosure, by obtaining the hardware execution cost of a single operator task to determine the total execution cost, the total execution cost of the parallel computing graph using the operator scheduling scheme in the cluster may be accurately obtained, such that a screening effect is better and more accurate.

With the technical solution of this embodiment, by turning on an option of automatic parallelization, the compiling stage and the execution stage may automatically run during submitting the target task, to which the user is imperceptible. By automatically querying the optimal parallel computing graph and the optimal operator scheduling scheme, 20%-40% of computing resources may be generally saved.

Embodiment 3

Figure 3:
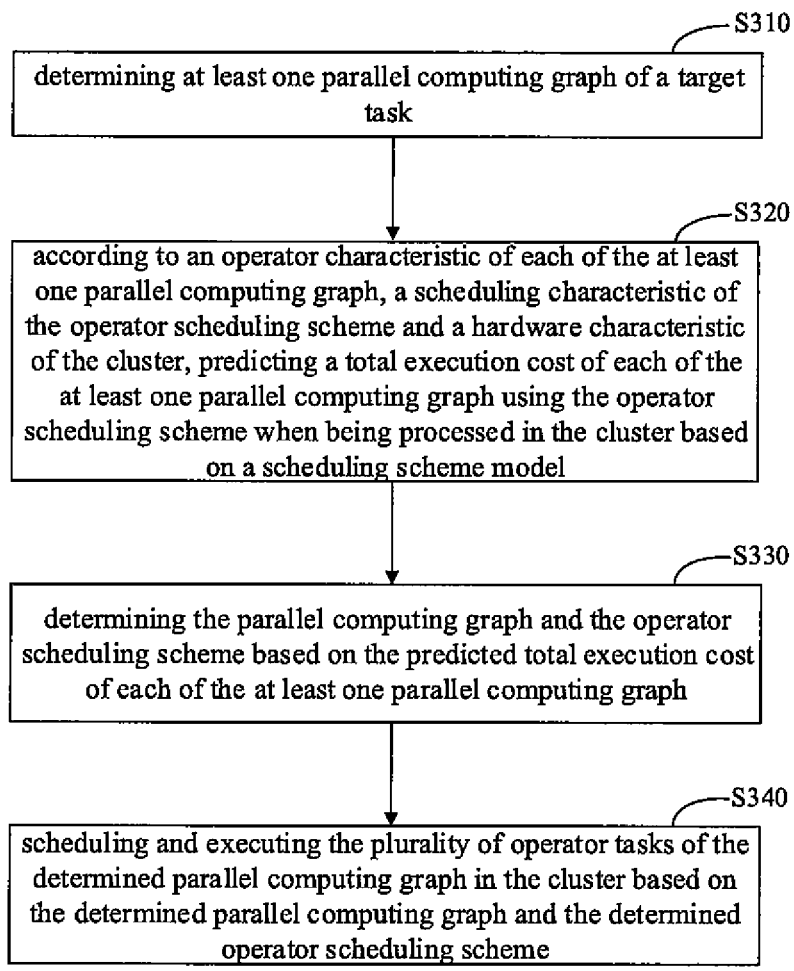
FIG. 3 is a flow chart illustrating a method for processing tasks in parallel according to Embodiment 3 of the present disclosure.

FIG. 3 is a flow chart illustrating a method for processing tasks in parallel according to Embodiment 3 of the present disclosure. On the basis of the above embodiments, this embodiment provides an implementation of predicting the total execution cost based on a model. The method of this embodiment includes the following.

At block S310, at least one parallel computing graph of a target task is determined.

At block S320, according to an operator characteristic of each of the at least one parallel computing graph, a scheduling characteristic of an operator scheduling scheme and a hardware characteristic of the cluster, a total execution cost of the parallel computing graph using the operator scheduling scheme when being processed in the cluster is predicted based on a scheduling scheme model.

For the determined parallel computing graph and the determined operator scheduling sequence, when the determined parallel computing graph and the determined operator scheduling sequence are distributed to clusters in the same situation for a plurality of times for execution, the total execution cost is generally unchanged. Moreover, among an operator condition in the parallel computing graph, the scheduling sequence in the operator scheduling scheme, and the hardware characteristic of the cluster, there are some key characteristics that affect the total execution cost. Therefore, the operator characteristic of the parallel computing graph, the scheduling characteristic of the operator scheduling scheme, and the hardware characteristic of the cluster may be learned by constructing a machine learning model, thereby completing the prediction of the total execution cost.

The training and learning of the scheduling scheme model may mainly refer to learning a key characteristic or a generalization characteristic that affects the total execution cost, including but not limited to the following aspects.

In a first aspect, the operator characteristic of the parallel computing graph includes at least one of: the hardware execution costs of the operator tasks, the number of the operator tasks, parameters of the operator tasks, types of the operator tasks, and the number of communication operator tasks.

The parameters of the operator task may be some parameters that affect the computation amount of the operator task, such as a convolution kernel parameter of a convolution operator. The types of operator tasks may be simply classified into a computation type and a communication type, and more specifically into such as subtraction, addition, and convolution operator. The types of operator tasks may be continuously optimized and adjusted based on an effect of the model learning.

In a second aspect, the scheduling characteristic of the operator scheduling scheme includes at least one of: the number and types of in-degree operator tasks of the communication operator tasks, the number and types of out-degree operator tasks of the communication operator tasks, and a concurrency of the parallel computing graph.

The scheduling characteristic of operator scheduling scheme mainly reflects the scheduling sequence. A characteristic reflecting a scheduling sequence of some operator tasks or a scheduling sequence of critical operator tasks may be preferably employed. For example, the execution period may be changed when a communication operator task is executed before or after different computation operator tasks. Therefore, binding characteristics (i.e, the number and types of in-degree operator tasks and the number and types of out-degree operator tasks) of other computation operator tasks near the communication operator task may be recorded and embodied in array. The concurrency of the parallel computing graph is an overall index, but may also reflect the scheduling sequence.

In a third aspect, hardware characteristics of the nodes in the cluster include: the number of the nodes and hardware performance indexes of the nodes.

The hardware performance index of the node may include, such as a GPU frequency, a bandwidth, and a memory space.

In the fourth aspect, the total execution cost is normalized data.

The total execution cost is preferably normalized to an interval ranging from 0 to 1, such that the total execution costs of different parallel computing graphs may be easily compared.

The scheduling scheme model used by this embodiment is a linear regression model.

At block S330, the parallel computing graph and the operator scheduling scheme are determined based on the predicted total execution cost.

The predicted total execution cost may be similar to the calculated total execution cost, based on which the parallel computing graphs and the operator scheduling schemes are screened.

At block S340, the plurality of operator tasks of the determined parallel computing graph are scheduled and executed in the cluster based on the determined parallel computing graph and the determined operator scheduling scheme.

In this embodiment, the scheduling scheme model is employed to predict a total execution cost of a certain parallel computing graph and an operator scheduling scheme in the cluster for screening. In this way, not only the hardware state of the cluster is considered, but also the dependence on a heuristic actual calculation and the resource occupation are reduced, thereby further improving the execution efficiency of the target task.

The scheduling scheme model used in this embodiment may be obtained by pre-training. The method of this embodiment also includes: obtaining a parallel computing graph and an operator scheduling scheme executed in a cluster from a history record as a training sample; and training the scheduling scheme model by using the operator characteristic of the parallel computing graph in the training sample, the scheduling characteristic of the operator scheduling scheme in the training sample, the hardware characteristic of the cluster and the total execution cost.

Data of the history record may be obtained to determine the parallel computation graph and the operator scheduling scheme based on Embodiment 2. Enough training samples may be obtained after a plurality of records.

In the above alternative implementation of the present disclosure, various characteristics of a parallel computing graph, an operator scheduling scheme, the cluster and a corresponding total execution cost of the parallel computing graph are learned by a model, such that the total execution cost may be predicted based on the model, and it is unnecessary to collect the hardware execution cost by actual measurement calculation in the cluster, thereby reducing resource occupation and improving the screening efficiency of the scheduling scheme.

Embodiments of the present disclosure provide a way of screening the parallel computing graphs and the operator scheduling schemes by a heuristic computation, and a way of screening the parallel computing graphs and the operator scheduling schemes by the model prediction, both of which may be implemented independently or in combination. Alternatively, the model prediction used as a coarse screening method is combined with the heuristic computation used as a fine screening method. After determining the parallel computing graph and the operator scheduling scheme based on the predicted total execution cost, the method also includes: in a case that a plurality of parallel computing graphs and/or a plurality of operator scheduling schemes are determined, scheduling the operator tasks to be executed in the cluster for each group of the determined parallel computing graph and the determined operator scheduling scheme; collecting the hardware execution cost of each operator task executed by the node; calculating the total execution cost of each group of the determined parallel computing graph and the determined operator scheduling scheme based on the hardware execution cost of each operator task; and determining the parallel computing graph and the operator scheduling scheme again based on the calculated total execution cost of each group of the determined parallel computing graph and the determined operator scheduling scheme.

The hardware performance of the determined cluster is generally unchanged. However, it is not excluded that the hardware performance of the cluster may change a little in different periods. Therefore, the determined parallel computing graphs and the determined operator scheduling schemes obtained by the coarse screening method by means of the model prediction may be tentatively scheduled to run in the current cluster, so as to measure the hardware execution performance, and then fine screening may be performed to determine the parallel computing graph and the operator scheduling scheme.

Embodiment 4

Figure 4A:
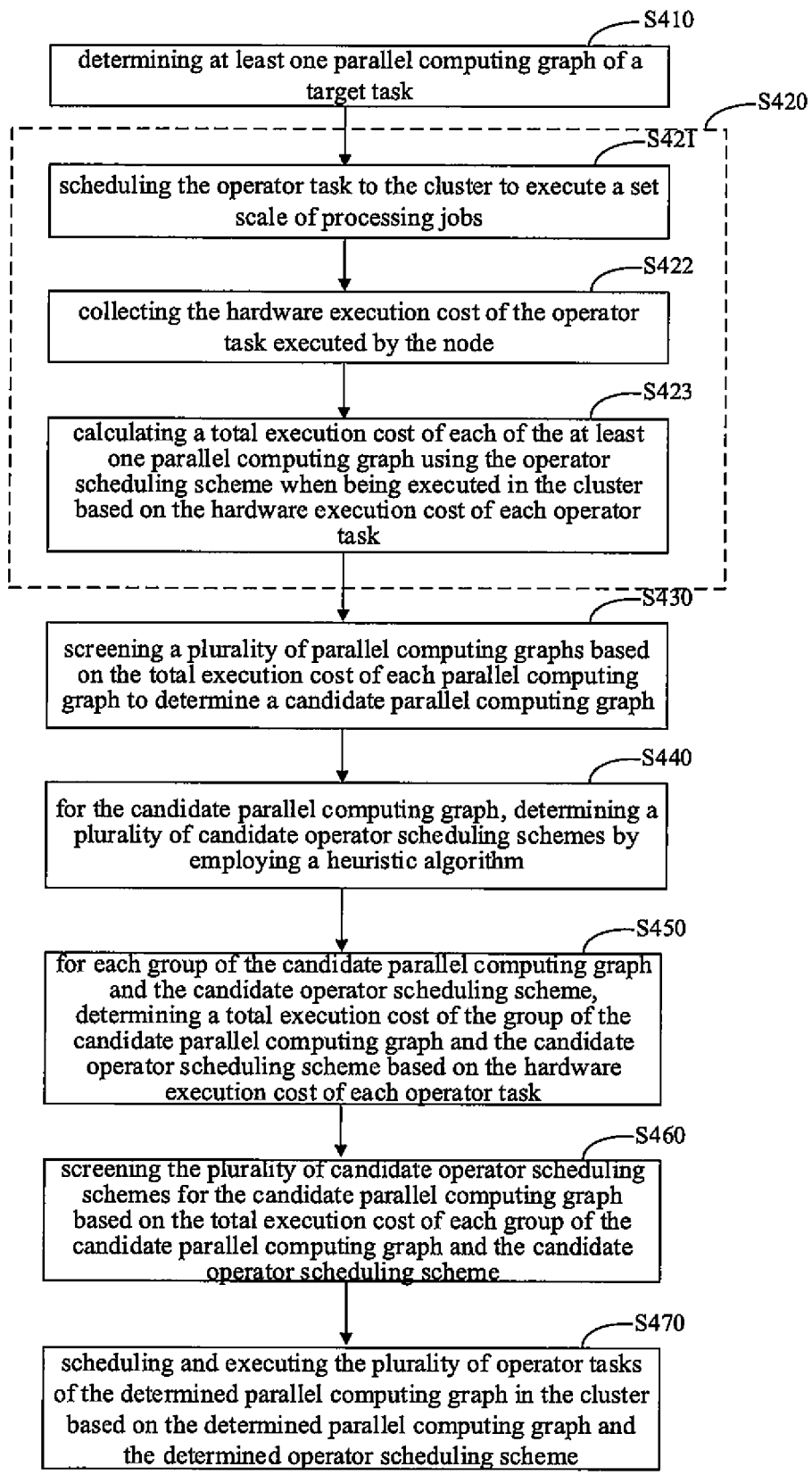
FIG. 4A is a flow chart illustrating a method for processing tasks in parallel according to Embodiment 4 of the present disclosure.
Figure 4B:
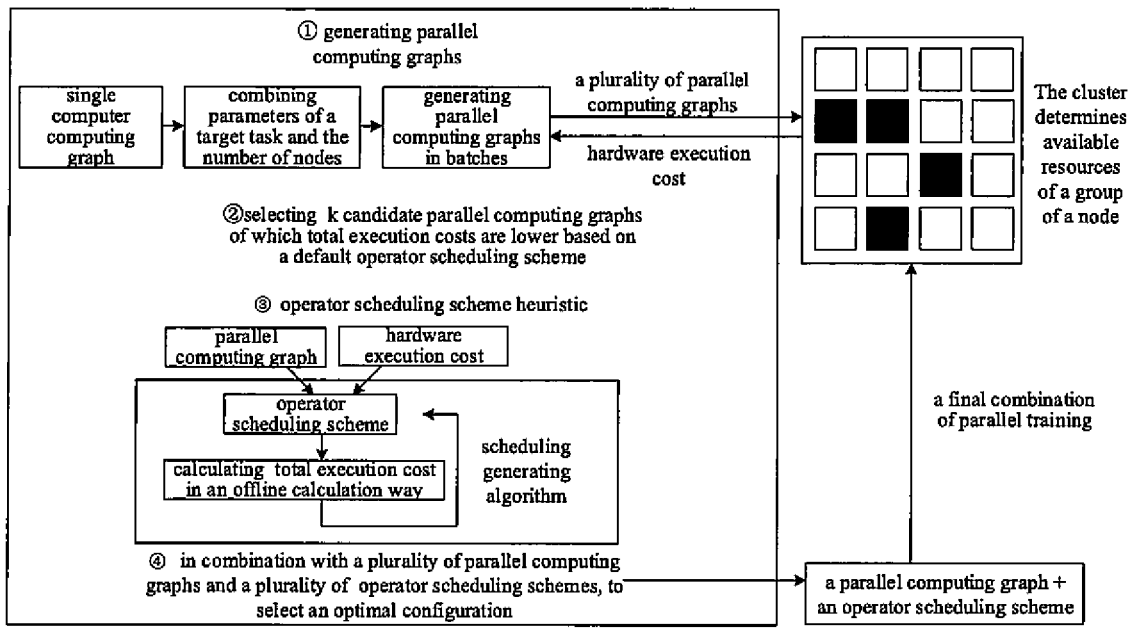
FIG. 4B is a flow chart illustrating an implementation procedure according to Embodiment 4 of the present disclosure.

FIG. 4A is a flow chart illustrating a method for processing tasks in parallel according to Embodiment 4 of the present disclosure. FIG. 4B is a flow chart illustrating an implementation procedure according to Embodiment 4 of the present disclosure. On the basis of the above embodiments, an alternative embodiment is provided, including the following.

At block S410, a plurality of parallel computing graphs of a target task are determined, and each of the plurality of parallel computing graphs includes a plurality of operator tasks.

In detailed, on the basis of a single computer computing graph, a plurality of parallel computing graphs are generated in batches based on the number of nodes that may be called in the cluster. Parallel efficiency optimization may be realized by generating the plurality of the parallel computing graphs based on multi-stream communication, gradient aggregation and hierarchical communication. The plurality of parallel computing graphs may be generated by sampling the number of streams in multi-stream communication, the combination of gradient aggregation, a communication method (such as hierarchical communication, 2D communication, ring communication). When different parallel computing graphs employ different gradient aggregations, a change may occur in the communication operator task.

At block S420, for each parallel computing graph and an initial operator scheduling scheme, the total execution cost of the parallel computing graph is determined based on a hardware execution cost of each operator task.

The initial operator scheduling scheme may be a scheme determined by a default scheduling policy. The total execution cost may be determined by a heuristic calculation or a model prediction.

Alternatively, when the total execution cost is determined by the heuristic calculation, the action at block S420 includes the following.

At block S421, the operator task is scheduled to the cluster to execute a set scale of processing jobs.

The plurality of parallel computing graphs may are respectively scheduled to callable nodes in the cluster for processing. As illustrated in FIG. 4B, the cluster may determine a node represented by a black square as an available resource for the target task.

At block S422, the hardware execution cost of the operator task executed by the node is collected.

At block S423, a total execution cost of each of the at least one parallel computing graph using the operator scheduling scheme when being executed in the cluster is calculated based on the hardware execution cost of each operator task.

At block S430, a plurality of parallel computing graphs are screened based on the total execution cost to determine a candidate parallel computing graph.

In detail, by sequencing the total execution costs, top k parallel computing graphs with better performances may be selected as candidate parallel computing graphs.

At block S440, for the candidate parallel computing graph, a plurality of candidate operator scheduling schemes are determined by employing a heuristic algorithm.

In detail, on the basis of the initial operator scheduling scheme, and on the premise of conforming to a topology rule of the parallel computing graph, various feasible operator scheduling schemes of the parallel computing graph may be generated, for example based on a disturbance. For example, all the feasible operator scheduling schemes may be determined as the candidate operator scheduling schemes by a heuristic adjustment. With this solution, an automatic querying algorithm is used to determine the plurality of operators scheduling schemes for screening.

At block S450, for each group of the candidate parallel computing graph and the candidate operator scheduling scheme, a total execution cost of the group of the candidate parallel computing graph and the candidate operator scheduling scheme is determined based on the hardware execution cost of each operator task.

Referring to the above description, the total execution cost may be determined for the candidate parallel computing graph and the candidate operator scheduling scheme. For example, the total execution cost may be calculated in an offline calculation way. The total execution cost may also be determined by the model prediction.

At block S460, the plurality of candidate operator scheduling schemes are screened for the candidate parallel computing graph based on the total execution cost of each group of the candidate parallel computing graph and the candidate operator scheduling scheme.

The total execution costs of a plurality of groups of the candidate parallel computing graph and the candidate operator scheduling schemes may be considered to select an optimal scheme.

At block S470, the plurality of operator tasks of the determined parallel computing graph are scheduled and executed in the cluster based on the determined parallel computing graph and the determined operator scheduling scheme.

With the technical solution of embodiments of the present disclosure, when the parallel computing graph and the operator scheduling scheme of the target task are determined, the cluster situation (i.e., the hardware execution cost) is considered. Compared with a parallel processing scheme independent of the cluster, in the technical solution of the present disclosure, the execution speed of the target task may be further accelerated, the concurrency is improved and the computing resource is saved. With embodiments of the present disclosure, the target task may be automatically matched with the cluster situation, and an appropriate parallel computing graph and an appropriate operator scheduling scheme are determined, advantages of which are particularly obvious in the deep learning field.

The target task in the deep learning field is generally the training of the machine learning model or the running of the practical application. The operator tasks of the target task are numerous and have complex relationships, and there may be a plurality of feasible scheduling schemes. With the technical solution of embodiments of the present disclosure, a deep learning framework may automatically get close to an optimal training speed in the clusters under different hardware environments.

Embodiment 5

Figure 5:
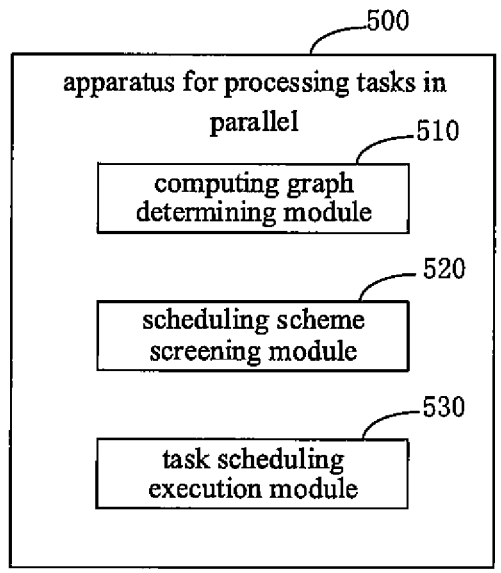
FIG. 5 is a block diagram illustrating an apparatus for processing tasks in parallel according to Embodiment 5 of the present disclosure.

FIG. 5 is a block diagram illustrating an apparatus for processing tasks in parallel according to Embodiment 5 of the present disclosure. The apparatus 500 includes: a computing graph determining module 510, a scheduling scheme screening module 520, and a task scheduling execution module 530.

The computing graph determining module 510 is configured to determine at least one parallel computing graph of a target task. Each of the at least one parallel computing graph includes a plurality of operator tasks.

The scheduling scheme screening module 520 is configured to determine a parallel computing graph and an operator scheduling scheme based on a hardware execution cost of each operator task of each of the at least one parallel computing graph in a cluster. The cluster includes a plurality of nodes for executing the plurality of operator tasks, and each parallel computing graph corresponds to at least one operator scheduling scheme.

The task scheduling execution module 530 is configured to schedule and to execute the plurality of operator tasks of the determined parallel computing graph in the cluster based on the determined parallel computing graph and the determined operator scheduling scheme.

With the technical solution of embodiments of the present disclosure, when the parallel computing graph and the operator scheduling scheme are determined for the target task, the hardware execution cost of each operator task in the cluster is considered as a screening basis, such that the execution of the target task may be better adapted to the clusters under different environmental conditions, to achieve an optimal parallel efficiency.

On the basis of the above embodiment, in an alternative embodiment, the scheduling scheme screening module 520 includes: an operator cost obtaining unit, a total cost calculating unit and a scheme screening unit. The operator cost obtaining unit is configured to obtain the hardware execution cost of each operator task executed by the node in the cluster. The total cost calculating unit is configured to calculate a total execution cost of each of the at least one parallel computing graph using the operator scheduling scheme when being executed in the cluster based on the hardware execution cost of each operator task. The scheme screening unit is configured to determine the parallel computing graph and the operator scheduling scheme based on the total execution cost.

Alternatively, the operator cost obtaining unit is configured to: schedule the operator task to the cluster to execute a set scale of processing jobs; and collect the hardware execution cost of the operator task executed by the node.

Alternatively, the total cost calculating unit is configured to: count the hardware execution costs of respective operator tasks based on a scheduling sequence in the operator scheduling scheme and a concurrency relation of respective operator tasks in the parallel computing graph to calculate the total execution cost.

On the basis of the above embodiment, in another alternative embodiment, the scheduling scheme screening module 520 is configured to: according to an operator characteristic of each of the at least one parallel computing graph, a scheduling characteristic of the operator scheduling scheme and a hardware characteristic of the cluster, predict a total execution cost of each of the at least one parallel computing graph using the operator scheduling scheme when being processed in the cluster based on a scheduling scheme model; and determine the parallel computing graph and the operator scheduling scheme based on the predicted total execution cost.

Alternatively, the apparatus also includes: a second screening module. The second screening module is configured to: in a case that a plurality of parallel computing graphs and/or a plurality of operator scheduling schemes are determined, schedule the operator tasks to be executed in the cluster for each group of the determined parallel computing graph and the determined operator scheduling scheme after determining the parallel computing graph and the operator scheduling scheme based on the predicted total execution cost of each of the at least one parallel computing graph; collect the hardware execution cost of each operator task executed by the node; calculate the total execution cost of each group of the determined parallel computing graph and the determined operator scheduling scheme based on the hardware execution cost of each operator task; and determine the parallel computing graph and the operator scheduling scheme again based on the calculated total execution cost of each group of the determined parallel computing graph and the determined operator.

Alternatively, the apparatus also includes: a model training module. The model training module is configured to obtain a parallel computation graph and an operator scheduling scheme executed in a cluster from a history record as a training sample; and to train the scheduling scheme model by using the operator characteristic of the parallel computing graph in the training sample, the scheduling characteristic of the operator scheduling scheme in the training sample, the hardware characteristic of the cluster and the total execution cost.

Alternatively, the operator characteristic of the parallel computing graph includes at least one of: the hardware execution costs of the operator tasks, a number of the operator tasks, parameters of the operator tasks, types of the operator tasks, and a number of communication operator tasks. The scheduling characteristic of the operator scheduling scheme includes at least one of: a number and types of in-degree operator tasks of the communication operator tasks, a number and types of out-degree operator tasks of the communication operator tasks, and a concurrency of the parallel computing graph. The hardware characteristic of the node of the cluster includes: a number of the nodes and hardware performance indexes of the nodes. The total execution cost is normalized data.

Alternatively, the scheduling scheme model is a linear regression model.

Alternatively, the computing graph determining module 510 is configured to: generate the at least one parallel computing graph based on a single computer computing graph of the target task and the number of the nodes in the cluster.

Alternatively, the type of the operator task at least includes: a computation type and a communication type. A computation operator task is configured to calculate data. A communication operator task is configured to transmit data between the nodes.

Alternatively, the target task is a training task or a running task of a machine learning model, and the computation operator task includes at least one of: a mathematical operator, an array operator and a neural-network building block operator.

Alternatively, the hardware execution cost of the operator task includes at least one of: an execution period of the operator task and hardware occupation data of the operator task. The hardware occupation data includes at least one of: a video memory occupation ratio, a chip utilization ratio, and a network bandwidth utilization ratio.

Alternatively, in a case that there are a plurality of types of hardware execution costs, the total execution cost is a combination of the plurality of types of total execution costs or a weighted sum value of the plurality of types of total execution costs.

Alternatively, the scheduling scheme screening module 520 is configured to: for each parallel computing graph and an initial operator scheduling scheme, determine the total execution cost of the parallel computing graph based on the hardware execution cost of each operator task; screen a plurality of parallel computing graphs based on the total execution cost of each parallel computing graph to determine a candidate parallel computing graph; for the candidate parallel computing graph, determine a plurality of candidate operator scheduling schemes by employing a heuristic algorithm; for each group of the candidate parallel computing graph and the candidate operator scheduling scheme, determine a total execution cost of the group of the candidate parallel computing graph and candidate operator scheduling schemes based on the hardware execution cost of each operator task; and screen the plurality of candidate operator scheduling schemes for the candidate parallel computing graph based on the total execution cost of each group of the candidate parallel computing graph and the candidate operator scheduling scheme.

Embodiment 6

According to embodiments of the present disclosure, the present disclosure also provides an electronic device and a readable storage medium.

Figure 6:
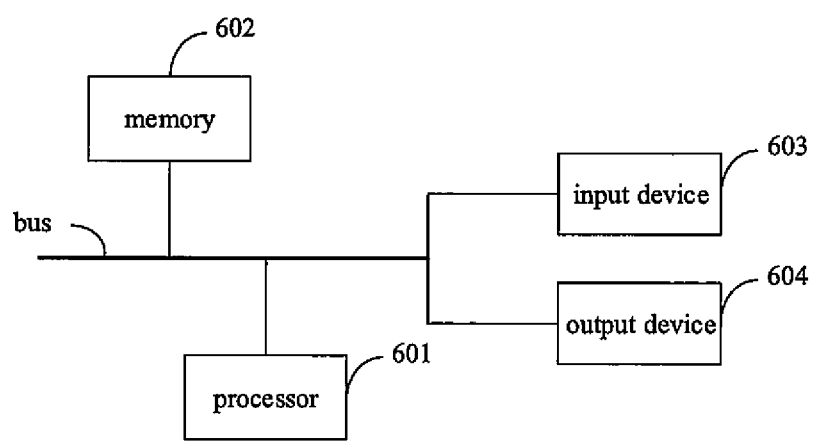
FIG. 6 is a block diagram illustrating an electronic device capable of implementing a method for processing tasks in parallel according to embodiments of the present disclosure.

As illustrated in FIG. 6, FIG. 6 is a block diagram illustrating an electronic according to Embodiment 6 of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, an intelligent phone, a wearable device and other similar computing device. The components, connections and relationships of the components, and functions of the components illustrated herein are merely examples, and are not intended to limit the implementation of the present disclosure described and/or claimed herein.

As illustrated in FIG. 6, the electronic device includes: one or more processors 601, a memory 602, and interfaces for connecting various components, including a high-speed interface and a low-speed interface. Various components are connected to each other by different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides a part of necessary operations (for example, as a server array, a group of blade servers, or a multiprocessor system). In FIG. 6, a processor 601 is taken as an example.

The memory 602 is a non-transitory computer readable storage medium provided by the present disclosure. The memory is configured to store instructions executed by at least one processor, to enable the at least one processor to execute a method for processing tasks in parallel according to embodiments of the present disclosure. The non-transitory computer readable storage medium according to the present disclosure is configured to store computer instructions. The computer instructions are configured to enable a computer to execute the method for processing the tasks in parallel according to embodiments of the present disclosure.

As the non-transitory computer readable storage medium, the memory 602 may be configured to store non-transitory software programs, non-transitory computer executable programs and modules, such as program instructions/modules (such as, the computing graph determining module 510 and the scheduling scheme screening module 520, and the task scheduling execution module 530) corresponding to the method for processing the tasks in parallel according to embodiments of the present disclosure. The processor 601 is configured to execute various functional applications and data processing of the server by operating non-transitory software programs, instructions and modules stored in the memory 602, that is, implements the method for processing the tasks in parallel according to the above method embodiments.

The memory 602 may include a storage program region and a storage data region. The storage program region may store an application required by an operating system and at least one function. The storage data region may store data created according to usage of the electronic device for executing the method for processing the tasks in parallel. In addition, the memory 602 may include a high-speed random access memory and a non-transitory memory, such as at least one disk memory device, a flash memory device, or other non-transitory solid-state memory device. In some embodiments, the memory 602 may alternatively include memories remotely located to the processor 601, and these remote memories may be connected to the electronic device for executing the method for processing the tasks in parallel through a network. Examples of the above network include, but are not limited to, an Internet, an intranet, a local area network, a mobile communication network and combinations thereof.

The electronic device capable of implementing the method for processing the tasks in parallel may also include: an input device 603 and an output device 604. The processor 601, the memory 602, the input device 603, and the output device 604 may be connected through a bus or in other means. In FIG. 6, the bus is taken as an example.

The input device 603 may receive inputted digital or character information, and generate key signal input related to user set and function control of the electronic device for executing the method for processing the tasks in parallel, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (such as, a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, receive data and instructions from a storage system, at least one input device, and at least one output device, and transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal configured to provide the machine instructions and/or data to the programmable processor.

To provide interaction with the user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system (such as, a data server) including a background component, a computing system (such as, an application server) including a middleware component, or a computing system including a front-end component (such as, a user computer having a graphical user interface or a web browser, through which the user may interact with embodiments of the system and technologies described herein), or a computing system including any combination of the background component, the middleware component, and the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact through the communication network. A relationship between the client and the server is generated by computer programs operated on a corresponding computer and having a client-server relationship with each other.

With embodiments of the present disclosure, when the parallel computing graph and the operator scheduling scheme are determined for the target task, the hardware execution cost of each operator task in the cluster is considered as a screening basis, such that the execution of the target task may be better adapted to the clusters of different environmental conditions, to achieve an optimal parallel efficiency.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A method for processing tasks in parallel, comprising:
   determining at least one parallel computing graph of a target task, each of the at least one parallel computing graph comprising a plurality of operator tasks;
   determining a parallel computing graph and an operator scheduling scheme based on a hardware execution cost of each operator task of each of the at least one parallel computing graph in a cluster, wherein the cluster comprises a plurality of nodes for executing the plurality of operator tasks, and each parallel computing graph corresponds to at least one operator scheduling scheme; and
   scheduling and executing the plurality of operator tasks of the determined parallel computing graph in the cluster based on the determined parallel computing graph and the determined operator scheduling scheme;
   wherein determining the parallel computing graph and the operator scheduling scheme based on the hardware execution cost of each operator task of each of the at least one parallel computing graph in the cluster comprises:
   for each parallel computing graph and an initial operator scheduling scheme, determining the total execution cost of the parallel computing graph based on the hardware execution cost of each operator task;
   screening a plurality of parallel computing graphs based on the total execution cost of each parallel computing graph to determine a candidate parallel computing graph;
   for the candidate parallel computing graph, determining a plurality of candidate operator scheduling schemes by employing a heuristic algorithm;
   for each group of the candidate parallel computing graph and the candidate operator scheduling scheme, determining a total execution cost of the group of the candidate parallel computing graph and the candidate operator scheduling scheme based on the hardware execution cost of each operator task; and
   screening the plurality of candidate operator scheduling schemes for the candidate parallel computing graph based on the total execution cost of each group of the candidate parallel computing graph and the candidate operator scheduling scheme.

2. The method of claim 1, wherein determining the parallel computing graph and the operator scheduling scheme based on the hardware execution cost of each operator task of each of the at least one parallel computing graph in the cluster comprises:
   obtaining the hardware execution cost of each operator task executed by the node in the cluster;
   calculating a total execution cost of each of the at least one parallel computing graph using the operator scheduling scheme when being executed in the cluster based on the hardware execution cost of each operator task; and
   determining the parallel computing graph and the operator scheduling scheme based on the total execution cost.

3. The method of claim 2, wherein obtaining the hardware execution cost of each operator task executed by the node in the cluster comprises:
   scheduling the operator task to the cluster to execute a set scale of processing jobs; and
   collecting the hardware execution cost of the operator task executed by the node.

4. The method of claim 2, wherein calculating the total execution cost of each of the at least one parallel computing graph using the operator scheduling scheme when being executed in the cluster based on the hardware execution cost of each operator task comprises:
   counting the hardware execution costs of respective operator tasks based on a scheduling sequence in the operator scheduling scheme and a concurrency relation of respective operator tasks in the parallel computing graph to calculate the total execution cost.

5. The method of claim 1, wherein determining the parallel computing graph and the operator scheduling scheme based on the hardware execution cost of each operator task of each of the at least one parallel computing graph in the cluster comprises:
   according to an operator characteristic of each of the at least one parallel computing graph, a scheduling characteristic of the operator scheduling scheme and a hardware characteristic of the cluster, predicting a total execution cost of each of the at least one parallel computing graph using the operator scheduling scheme when being processed in the cluster based on a scheduling scheme model; and
   determining the parallel computing graph and the operator scheduling scheme based on the predicted total execution cost.

6. The method of claim 5, wherein after determining the parallel computing graph and the operator scheduling scheme based on the predicted total execution cost, the method further comprises:
- in a case that a plurality of parallel computing graphs and/or a plurality of operator scheduling schemes are determined, scheduling the operator tasks to be executed in the cluster for each group of the determined parallel computing graph and the determined operator scheduling scheme;
- collecting the hardware execution cost of each operator task executed by the node;
- calculating the total execution cost of each group of the determined parallel computing graph and the determined operator scheduling scheme based on the hardware execution cost of each operator task; and
- determining the parallel computing graph and the operator scheduling scheme again based on the calculated total execution cost of each group of the determined parallel computing graph and the determined operator.

7. The method of claim 5, wherein the method further comprises:
- obtaining a parallel computing graph and an operator scheduling scheme executed in a cluster from a history record as a training sample; and
- training the scheduling scheme model by using the operator characteristic of the parallel computing graph in the training sample, the scheduling characteristic of the operator scheduling scheme in the training sample, the hardware characteristic of the cluster and the total execution cost.

8. The method of claim 5, wherein the operator characteristic of the parallel computing graph comprises at least one of: the hardware execution costs of the operator tasks, a number of the operator tasks, parameters of the operator tasks, types of the operator tasks, and a number of communication operator tasks;
- the scheduling characteristic of the operator scheduling scheme comprises at least one of: a number and types of in-degree operator tasks of the communication operator tasks, a number and types of out-degree operator tasks of the communication operator tasks, and a concurrency of the parallel computing graph;
- a hardware characteristic of the node of the cluster comprises: a number of the nodes and hardware performance indexes of the nodes; and
- the total execution cost is normalized data.

9. The method of claim 5, wherein the scheduling scheme model is a linear regression model.

10. The method of claim 1, wherein determining the at least one parallel computing graph of the target task comprises:
- generating the at least one parallel computing graph based on a single computer computing graph of the target task and the number of the nodes in the cluster.

11. The method of claim 1, wherein the type of the operator task at least comprises: a computation type and a communication type;
- a computation operator task is configured to calculate data; and
- a communication operator task is configured to transmit data between the nodes.

12. The method of claim 11, wherein the target task is a training task or a running task of a machine learning model, and the computation operator task comprises at least one of: a mathematical operator, an array operator and a neural-network building block operator.

13. The method of claim 1, wherein the hardware execution cost of the operator task comprises at least one of: an execution period of the operator task and hardware occupation data of the operator task; and
- the hardware occupation data comprises at least one of: a video memory occupation ratio, a chip utilization ratio, and a network bandwidth utilization ratio.

14. The method of claim 13, wherein in a case that there are a plurality of types of hardware execution costs, the total execution cost is a combination of the plurality of types of total execution costs or a weighted sum value of the plurality of types of total execution costs.

15. An electronic device, comprising:
- at least one processor; and
- a memory, communicatively coupled to the at least one processor,
- wherein the memory is configured to store instructions executed by the at least one processor, and when the instructions are executed by the at least one processor, the at least one processor is caused to execute the method for processing the tasks in parallel comprising:
- determining at least one parallel computing graph of a target task, each of the at least one parallel computing graph comprising a plurality of operator tasks;
- determining a parallel computing graph and an operator scheduling scheme based on a hardware execution cost of each operator task of each of the at least one parallel computing graph in a cluster, wherein the cluster comprises a plurality of nodes for executing the plurality of operator tasks, and each parallel computing graph corresponds to at least one operator scheduling scheme; and
- scheduling and executing the plurality of operator tasks of the determined parallel computing graph in the cluster based on the determined parallel computing graph and the determined operator scheduling scheme;
- wherein determining the parallel computing graph and the operator scheduling scheme based on the hardware execution cost of each operator task of each of the at least one parallel computing graph in the cluster comprises:
- for each parallel computing graph and an initial operator scheduling scheme, determining the total execution cost of the parallel computing graph based on the hardware execution cost of each operator task;
- screening a plurality of parallel computing graphs based on the total execution cost of each parallel computing graph to determine a candidate parallel computing graph;
- for the candidate parallel computing graph, determining a plurality of candidate operator scheduling schemes by employing a heuristic algorithm;
- for each group of the candidate parallel computing graph and the candidate operator scheduling scheme, determining a total execution cost of the group of the candidate parallel computing graph and the candidate operator scheduling scheme based on the hardware execution cost of each operator task; and
- screening the plurality of candidate operator scheduling schemes for the candidate parallel computing graph based on the total execution cost of each group of the candidate parallel computing graph and the candidate operator scheduling scheme.

16. The device of claim 15, wherein determining the parallel computing graph and the operator scheduling scheme based on the hardware execution cost of each operator task of each of the at least one parallel computing graph in the cluster comprises:

obtaining the hardware execution cost of each operator task executed by the node in the cluster;

calculating a total execution cost of each of the at least one parallel computing graph using the operator scheduling scheme when being executed in the cluster based on the hardware execution cost of each operator task; and determining the parallel computing graph and the operator scheduling scheme based on the total execution cost.

17. The device of claim 15, wherein determining the parallel computing graph and the operator scheduling scheme based on the hardware execution cost of each operator task of each of the at least one parallel computing graph in the cluster comprises:

according to an operator characteristic of each of the at least one parallel computing graph, a scheduling characteristic of the operator scheduling scheme and a hardware characteristic of the cluster, predicting a total execution cost of each of the at least one parallel computing graph using the operator scheduling scheme when being processed in the cluster based on a scheduling scheme model; and determining the parallel computing graph and the operator scheduling scheme based on the predicted total execution cost.

18. A non-transitory computer readable storage medium having computer instructions stored thereon, wherein the computer instructions are configured to enable a computer to execute the method for processing the tasks in parallel comprising:

determining at least one parallel computing graph of a target task, each of the at least one parallel computing graph comprising a plurality of operator tasks;

determining a parallel computing graph and an operator scheduling scheme based on a hardware execution cost of each operator task of each of the at least one parallel computing graph in a cluster, wherein the cluster comprises a plurality of nodes for executing the plurality of operator tasks, and each parallel computing graph corresponds to at least one operator scheduling scheme; and scheduling and executing the plurality of operator tasks of the determined parallel computing graph in the cluster based on the determined parallel computing graph and the determined operator scheduling scheme;

wherein determining the parallel computing graph and the operator scheduling scheme based on the hardware execution cost of each operator task of each of the at least one parallel computing graph in the cluster comprises:

for each parallel computing graph and an initial operator scheduling scheme, determining the total execution cost of the parallel computing graph based on the hardware execution cost of each operator task;

screening a plurality of parallel computing graphs based on the total execution cost of each parallel computing graph to determine a candidate parallel computing graph;

for the candidate parallel computing graph, determining a plurality of candidate operator scheduling schemes by employing a heuristic algorithm;

for each group of the candidate parallel computing graph and the candidate operator scheduling scheme, determining a total execution cost of the group of the candidate parallel computing graph and the candidate operator scheduling scheme based on the hardware execution cost of each operator task; and screening the plurality of candidate operator scheduling schemes for the candidate parallel computing graph based on the total execution cost of each group of the candidate parallel computing graph and the candidate operator scheduling scheme.

* * * * *